UNITED STATES PATENT OFFICE.

HOMER T. YARYAN, OF TOLEDO, OHIO.

PROCESS FOR THE TREATMENT OF ROSIN.

No. 915,402.  Specification of Letters Patent.  Patented March 16, 1909.

Application filed November 4, 1908. Serial No. 461,066.

*To all whom it may concern:*

Be it known that I, HOMER T. YARYAN, a citizen of the United States, residing at Toledo, in the county of Lucas and State of Ohio, have invented a certain new and useful Process for the Treatment of Rosin; and I do declare the following to be a full, clear, and exact description of the invention, such as will enable others skilled in the art to which it appertains to practice and use the same.

When rosin is extracted from stumps and dead timber of resinous woods, the product has impurities and is of objectionable color which lower the grade of the rosin and lessen its value. This is due largely to the fact that these woods have usually been swept by flames, which have burned the outside of the timber. There appears to be a zone, lying next to the charred wood containing rosin which is affected by the heat, which forms pitch and converts some of the abietic acid into colophonic acid. In the treatment of these woods with a hydrocarbon solvent for the purpose of recovering the rosin, the solvent dissolves these objectionable impurities which now mix with and remain in the recovered rosin, impairing its color and lowering its grade. After the rosin has become discolored by the presence of these objectionable substances, it has heretofore been found commercially impracticable to purify the rosin and to give it the desired color. To overcome these difficulties, I dissolve the rosin in about four parts of hydrocarbon solvent as petroleum. This solution is next treated by agitation with about an equal volume of sulfuric acid of about 66% strength. After decanting, the solution may be again treated with sulfuric acid of say 80% strength until the required color is obtained. No stated quantity or strength of acid can be named, as different rosins require different strengths and quantities. After again decanting the solution I thoroughly wash it with pure water to remove any remaining trace of acid and then evaporate the solution in the usual or any preferred manner to recover the rosin.

The process thus far indicated has been made the subject of a separate application for Letters Patent of the United States, filed September 30, 1908, Serial No. 455,459 and allowed November 23, 1908.

After the purified rosin has been recovered, as above indicated, the low grade rosin and impurities which have been removed remain in the acid as a precipitate which forms a thick party mass or sludge.

The object of the present invention is to separate and recover from this precipitate or sludge the low grade rosin, which has now been separated from the high grade rosin by the process above indicated and to recover also the sulfuric acid. To this end, I first treat the mixture of acid and sludge with about one-half its volume of water, by mixing and agitating the same. This forms a curd containing the rosin and which floats upon the surface of the dilute acid and which is of about the consistency of soft beeswax. This curd is now separated and recovered mechanically,—as by siphoning off the dilute acid,—and is next treated. It should be understood that the rosin contained in this curd-like mixture is no longer soluble in a hydrocarbon solvent, except to a slight degree. I find, however, that if turpentine is employed and substituted for a hydrocarbon as a solvent, a complete solution of the rosin in the curd-like mixture takes place. I therefore treat the curd-like substance with about five parts of turpentine to one of curd-like substance to dissolve the rosin. The turpentine dissolves all of the curd-like substance, except foreign substances, such as dirt, which are left as a sediment. After the treatment with turpentine, the solution of turpentine and rosin is evaporated to separate and recover the solvent and rosin. The turpentine is thus readily recovered in an uninjured condition, and the dark low grade rosin, which would otherwise be lost in refining the process, is saved.

Instead of separating the curd from the weak acid, the turpentine may, if preferred, be mixed with the weak acid and curd, and the curd will be dissolved by heating the mixture. Now the solution of rosin and turpentine becomes separated by gravity,—the solution floating upon the weak acid,—and the two liquids may now be separated by decanting or otherwise. The solution of turpentine and rosin is now treated, as above indicated, for the separation and recovery of the turpentine and rosin. The separated dilute acid is then heated and concentrated in lead pans and may be used over an indefinite number of times.

Having described my invention, what I claim and desire to secure by Letters Patent is,—

1. In the process of purifying rosin, the steps of treating a precipitate of rosin in sulfuric acid, which consist in treating the precipitate with water to effect curd-like separation of the rosin, and then mechanically recovering the curd-like portion for subsequent treatment.

2. In the purification of rosin, the steps of treating a precipitate of rosin in sulfuric acid, which consist in treating the precipitate first with water to cause separation, then dissolving the rosin in a suitable solvent, and then recovering the solvent and rosin by evaporation.

3. In the purification of rosin, the process of treating a precipitate of rosin in sulfuric acid, which consists in treating the precipitate first with water to cause separation, then dissolving the rosin in a suitable solvent, and then recovering the dilute acid by concentration with heat.

4. In the purification of rosin, the process of treating a precipitate of rosin in sulfuric acid, which consists in treating the precipitated rosin first with water to cause separation, then dissolving the rosin in a suitable solvent, then recovering the solvent and rosin by evaporation, and then recovering the dilute acid by concentration with heat.

5. The process of refining rosin which consists in dissolving the rosin in a suitable solvent, then treating the solution with sulfuric acid to precipitate the darker portions of the rosin from the solution, then treating the remaining solution for the separation and recovery of the solvent and the rosin, then treating the precipitate with water, then treating the curd-like portion thus obtained with a suitable solvent to dissolve the residue of rosin, and then treating the solution for the separation and recovery of the rosin and solvent.

In testimony whereof I affix my signature in presence of two witnesses.

HOMER T. YARYAN.

Witnesses:
P. M. CRAGO,
ADA E. CAMERON.